Sept. 8, 1953   J. H. STARK   2,651,733
LUNDEL ROTOR CONSTRUCTION
Filed June 14, 1952
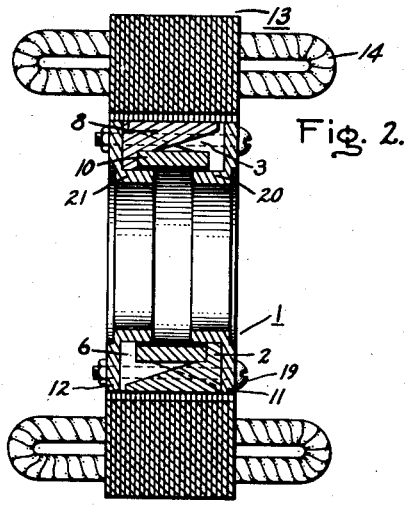
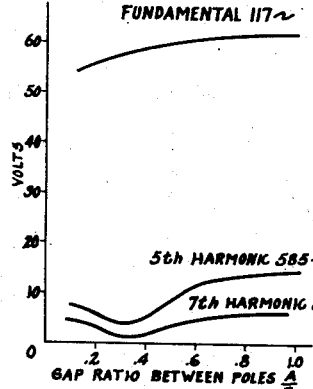
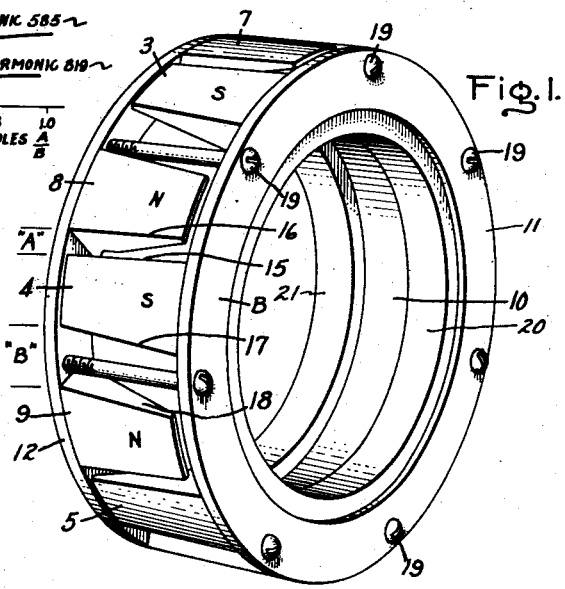
Inventor:
Julian H. Stark.
by Powell F. Mack
His Attorney.

Patented Sept. 8, 1953

2,651,733

UNITED STATES PATENT OFFICE 2,651,733

LUNDEL ROTOR CONSTRUCTION

Julian H. Stark, Fort Wayne, Ind., assignor to General Electric Company, a corporation of New York Application June 14, 1952, Serial No. 293,633

8 Claims. (Cl. 310—111)

This invention relates to field structures for dynamoelectric machines and more particularly to field structures of the lundel type.

In the lundel type of field construction commonly used in dynamoelectric machines, a first group of evenly spaced circumferentially arranged teeth is provided and a second group of similarly arranged teeth is also provided interspaced between the teeth of the first group. Such a field construction may be used either in a rotor member, in which case the outer surfaces of the teeth define the outer circumferential surface of the rotor, or in a stator member in which case the inner circumferential surfaces of the teeth define the inner circumferential bore of the stator. In either construction, means are arranged on the side of the teeth remote from their effective or air gap surface for exciting the teeth of one group at one polarity and the teeth of the other group at the opposite polarity. The exciting means may be either an annular axially polarized permanent magnet ring or an annular field coil. Field structures of this type are commonly used in induction alternators in which case the lundel field structure is usually formed as the rotor of the machine.

It has been found in the design of induction alternators having rotating lundel-type fields, that the fifth, seventh, eleventh and thirteenth harmonics are of considerable magnitude. The third harmonic and multiples thereof may be eliminated by employing a Y-connected stator winding, however, it is highly desirable to reduce the magnitude of the other harmonics to the lowest practicable level without substantially reducing the magnitude of the fundamental frequency generated.

It is therefore an object of this invention to provide an improved lundel-type field construction for a dynamoelectric machine wherein the harmonics are substantially reduced.

Further objects and advantages of this invention will become apparent and the invention will be better understood by reference to the following description and the accompanying drawing, and the features of novelty which characterize this invention will be pointed out with particularity in the claims annexed to and forming a part of this specification.

This invention in its broadest aspects provides a lundel-type field structure wherein the leakage gap between the adjacent sides of the teeth may be varied thereby to vary the magnitude of the harmonics generated without substantially affecting the magnitude of the fundamental. More specifically, the teeth of one group are radially displaced from the center lines of the spaces between the teeth of the other group so that the leakage gap between each tooth of the one group and the adjacent tooth of the other group on one side thereof is substantially greater than the leakage gap between such tooth and the adjacent tooth of the other group on the other side thereof. In accordance with the further feature of this invention, the teeth of one group may be circumferentially movable with respect to teeth of the other group so that the circumferential leakage gap between each tooth of the first group and the teeth of the other group on either side thereof may be varied.

In the drawing, Fig. 1 is a view in perspective showing the improved lundel-field structure of this invention; Fig. 2 is a side elevational view, partly in section, further illustrating the improved construction of Fig. 1; and Fig. 3 is a chart graphically illustrating the reduction in harmonics by virtue of the improved construction of this invention.

Referring now to Figs. 1 and 2, there is shown a rotating lundel-type field structure 1 having a first group of evenly spaced, axially extending, circumferentially arranged teeth formed of magnetic material including teeth 3, 4 and 5, each tooth having a radially inwardly extending finger 2 formed at its base. A second group of similarly arranged teeth is provided, also formed of magnetic material, such as teeth 7, 8 and 9, each having a radially inwardly extending finger 6 formed at its base. It is easily seen that the teeth 3, 4 and 5 and the remaining similar teeth of the first group extend into the spaces between the teeth of the second group, i. e. tooth 3 is interspaced between teeth 7 and 8, tooth 4 is interspaced between teeth 8 and 9, and so on. Each of the teeth is tapered axially and radially toward its end as clearly shown in Figs. 1 and 2.

In order to polarize the teeth of Figs. 1 and 2, an annular permanent magnet 10 is provided arranged within the teeth and axially abutting the fingers 2 and 6. The permanent magnet 10 will then polarize the teeth of the first group including teeth 3, 4 and 5, at one polarity, for example south, and teeth of the other group including teeth 7, 8 and 9, at the opposite polarity, for example north. It will be readily apparent that a suitable electromagnet may be substituted for the annular permanent magnet 10 with suitable slip rings being used to supply current thereto. A pair of annular non-magnetic flanges 11 and 12 respectively abut the bases of the teeth to hold the assembly together. Flanges 11 and 12 are respectively provided with integrally formed mounting rings 20 and 21 radially spaced from permanent magnet 10. These rings are adapted to secure the field structure 1 to a rotatable shaft (not shown). A plurality of non-magnetic clamp bolts 19 hold the structure together as will be hereinafter described. The rotatable field structure 1 is suitably arranged within a stator structure 13, shown as being formed of a plurality of relatively thin laminations of magnetic material and having a suitable stator winding 14 arranged therein. The stator structure and the stator windings arranged therein form no part of this invention and will not be further described.

In lundel-type field structures previously constructed, the teeth on one side were centrally located in the spaces between the teeth on the other side. It has been found, however, that varying the leakage gap between the adjacent sides of the teeth substantially reduces the harmonic content of the output voltage of the machine. Referring again to Fig. 1, it will be seen that the circumferential leakage gap distance "A" between the side 15 of tooth 4 and the side 16 of tooth 8 is substantially smaller than the circumferential leakage gap distance "B" between the side 17 of tooth 4 and the side 18 of tooth 9. Referring now to Fig. 3, there is shown plotted the gap ratio between the poles expressed as distance "A" divided by the distance "B" against the output voltage. It is readily seen that as the teeth of the first group are radially displaced from the center lines of the spaces between the teeth of the second group thereby to increase the leakage gaps "B" and decrease the leakage gaps "A," the magnitude of the 5th and 7th harmonics is reduced and in a machine actually built and tested, it was found that the 5th, 7th and higher harmonics reach a minimum at a gap ratio of approximately .3 whereas the magnitude of the fundamental is smoothly reduced over the same gap ratio range with a much greater reduction in the relative magnitude of the harmonics taking place than in the magnitude of the fundamental. The maximum reduction in harmonic content and the optimum gap ratio may vary depending on various other characteristics of the machine. However, it is always found where the leakage gap distance "B" is substantially greater than the leakage gap distance "A," i. e. where the teeth of one group are substantially radially displaced from the center lines of the spaces between the teeth of the other group.

In order to provide for adjusting the relative widths of the leakage gaps "B" and "A," the structure is held in assembled relation by a plurality of non-magnetic clamp bolts 19 extending through suitable holes in annular flanges 11 and 12. It is thus seen that by loosening the bolts 19, the teeth of the first group including teeth 3, 4 and 5, may be rotated with respect to the teeth of the second group including teeth 7, 8 and 9, thus varying the widths of the gaps "B" and "A" to reduce the harmonic component of the output voltage to a minimum.

It is now seen that this invention provides a simple and economical lundel-type field construction wherein the harmonic values may be readily adjusted without substantially affecting the value of the fundamental.

While I have shown and described a particular embodiment of this invention, further modifications and improvements will occur to those skilled in the art. I desire it to be understood, therefore, that this invention is not limited to the form shown and I intend in the appended claims to cover all modifications which do not depart from the spirit and scope of this invention.

What I claim as new and desire to secure by Letters Patent of the United States is:

1. In a dynamoelectric machine, a field structure comprising a first group of circumferentially arranged evenly spaced axially extending teeth, a second group of circumferentially arranged evenly spaced axially extending teeth extending respectively into the spaces between the teeth of said first group, said second group of teeth being respectively circumferentially offset from the axial center lines of said spaces between the teeth of said first group thereby to reduce the magnitude of the harmonics normally generated by said machine, and means arranged to excite said first group of teeth at one polarity and said second group of teeth at the opposite polarity.

2. In a dynamoelectric machine, a field structure comprising a first group of circumferentially arranged evenly spaced axially extending teeth, a second group of circumferentially arranged evenly spaced axially extending teeth extending respectively into the spaces between the teeth of said first group, means arranged to excite said first group of teeth at one polarity and said second group of teeth at the opposite polarity, and adjustable means arranged to hold said first and second groups of teeth and said exciting means in assembled relation whereby the teeth of said second group may be circumferentially offset from the axial center lines of said spaces between the teeth of said first group so that the magnitude of the harmonics normally generated by said machine is varied.

3. In a dynamoelectric machine, a field structure comprising a first group of circumferentially arranged evenly spaced axially extending teeth, a second group of circumferentially arranged evenly spaced axially extending teeth extending respectively into the spaces between the teeth of said first group, adjustable means arranged to hold said first and second groups of teeth in assembled relation whereby the teeth of said second group may be circumferentially offset from the axial center lines of said spaces between the teeth of said first group thereby to vary the magnitude of the harmonics normally generated by said machine, and means arranged to excite said first group of teeth at one polarity and said second group of teeth at the opposite polarity.

4. In a dynamoelectric machine, a field structure comprising a first group of circumferentially arranged evenly spaced axially extending teeth, a second group of circumferentially arranged evenly spaced axially extending teeth extending respectively into the spaces between the teeth of said first group, adjustable means arranged to hold said first and second groups of teeth in assembled relation whereby the teeth of said second group may be circumferentially offset from the axial center lines of said spaces between the teeth of said first group whereby the leakage gap between adjacent sides of said first and second groups of teeth may be varied thereby to vary the magnitude of the harmonics normally generated by said machine, and means arranged to excite said first group of teeth at one polarity and said second group of teeth at the opposite polarity.

5. In a dynamoelectric machine, a field structure comprising a first group of circumferentially arranged evenly spaced axially extending teeth, a second group of circumferentially arranged evenly spaced axially extending teeth extending respectively into the spaces between the teeth of said first group, said second group of teeth being circumferentially movable with respect to said first group of teeth thereby to vary the leakage gaps between adjacent sides of said first and second groups of teeth whereby the magnitude of the harmonics normally generated by said machine is varied, and means arranged to excite said first group of teeth at one polarity and said second group of teeth at the opposite polarity.

6. In a dynamoelectric machine, a field structure comprising a first group of circumferentially arranged evenly spaced axially extending teeth, a second group of circumferentially arranged evenly spaced axially extending teeth extending respectively into the spaces between the teeth of said first group, each tooth of said second group defining a relatively wide radial leakage gap with the adjacent tooth of said first group on one side thereof and a relatively narrow radial leakage gap with the adjacent tooth of said first group on the other side thereof thereby to reduce the magnitude of the harmonics normally generated by said machine, and means arranged to excite said first group of teeth at one polarity and said second group of teeth at the opposite polarity.

7. In a dynamoelectric machine, a field structure comprising a first group of circumferentially arranged evenly spaced axially extending teeth of magnetic material, a second group of circumferentially arranged evenly spaced axially extending teeth formed of magnetic material extending respectively into the spaces between the teeth of said first group, each of said teeth having a radially inwardly extending finger formed at the base thereof, and an axially polarized annular permanent magnet arranged with its axial ends respectively abutting the fingers of said first and second groups of teeth thereby to excite said first group of teeth at one polarity and said second group of teeth at one polarity and said second group of teeth at the opposite polarity, each tooth of said second group defining a relatively wide radial leakage gap with the adjacent tooth of said first group on one side thereof and a relatively narrow radial leakage gap with the adjacent tooth of said first group and the other side thereof thereby to reduce the magnitude of the harmonics normally generated by said machine.

8. In a dynamoelectric machine, a field structure comprising a first group of circumferentially arranged evenly spaced axially extending teeth formed of magnetic material, a second group of circumferentially arranged evenly spaced axially extending teeth formed of magnetic material extending respectively into the spaces between the teeth of said first group, each of said teeth having a radially inwardly extending finger formed at the base thereof, an axially polarized annular permanent magnet arranged between said first and second groups of teeth with its axial ends respectively abutting the fingers of said first and second groups of teeth thereby to excite said first group of teeth of one polarity and said second group of teeth at the opposite polarity, a pair of annular flange members respectively abutting the base of said first and second groups of teeth, and clamping means engaging said flange members thereby to hold said structure in an assembled relation, said clamping means being adapted to be loosened whereby said second group of teeth may be circumferentially moved with respect to said first group of teeth thereby to vary the leakage gaps between adjacent sides of said first and second groups of teeth whereby the magnitude of the harmonics normally generated by said machine is varied.

JULIAN H. STARK.

References Cited in the file of this patent

UNITED STATES PATENTS

| Number | Name | Date |
|---|---|---|
| 450,219 | Collins | Apr. 14, 1891 |
| 2,450,664 | Jones | Oct. 5, 1948 |
| 2,509,583 | Youhouse | May 30, 1950 |